J. P. SIEGFRIED.
COOPERS' CROZE.
No. 178,473.
Patented June 6, 1876.
Fig: 1.
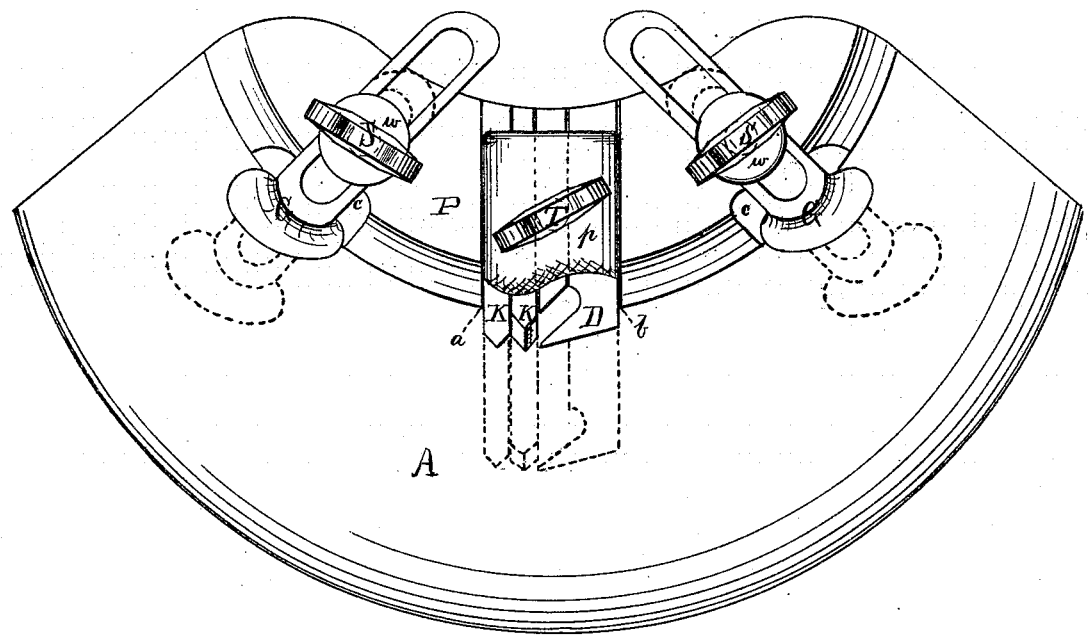
Fig: 2.
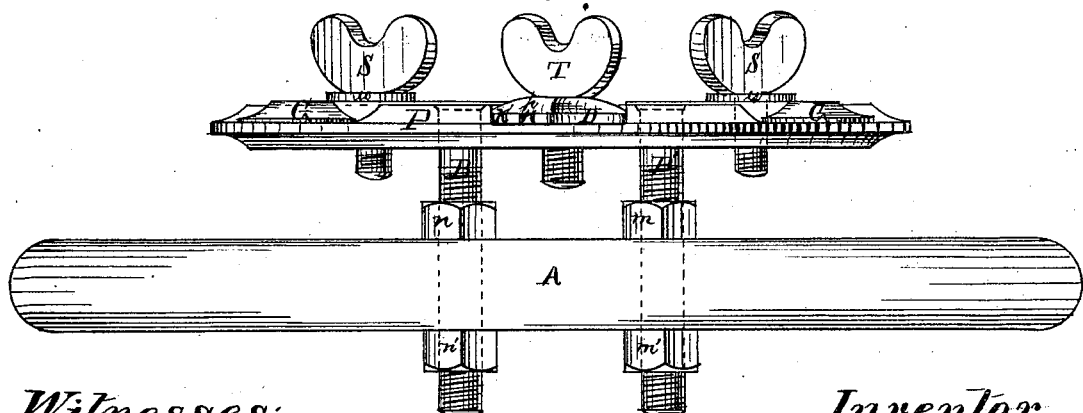
Witnesses:
Henry Eichling
R. S. Clark
Inventor:
John P. Siegfried
By Fitch/Fitch
his Attys.

UNITED STATES PATENT OFFICE.

JOHN P. SIEGFRIED, OF SANDUSKY, OHIO.

IMPROVEMENT IN COOPERS' CROZES.

Specification forming part of Letters Patent No. 178,473, dated June 6, 1876; application filed June 12, 1875.

*To all whom it may concern:*

Be it known that I, JOHN P. SIEGFRIED, of Sandusky city, county of Erie, and State of Ohio, have invented an Improvement in Coopers' Crozes, of which the following is a specification, reference being had to the accompanying drawings, forming part hereof.

This invention has relation to coopers' crozes; and consists in a semicircular plate carrying adjustable gages and cutting-knives, said plate being adjustably connected to the stock or head by bolts and nuts, as will be hereinafter described, and subsequently pointed out in the claim.

Figure 1 is a plan of an inverted coopers' croze embodying my invention. Fig. 2 is a front elevation of the same.

A is the stock or head, preferably of wood, and having the form shown. P is the semicircular plate carrying the gages and cutting-gear. G G are gages, arranged to slide in channels $c$ in the plate P, on the lines of radii having a common center, as shown, and secured, when adjusted in position, by the thumb-screws S S, which are provided with washers $w$ $w$. K K are the cutting-knives, and D is the hooked router, arranged to be adjustable in channels or depressions $a$ and $b$, respectively, in the plate P, as shown, and secured in place by the pressure-plate $p$ and the thumb-screw T, as shown. B and B' are bolts, provided with nuts $n$ $n'$ and $m$ $m'$, respectively, by means of which the plate P is secured to, and may be adjusted at a greater or less distance from, the stock A, as shown.

Now, it is evident that by means of the adjustable gages G G, and knives K K, and router D, forming the cutting-gear, the same tool may be conveniently and readily arranged to cut the chine in barrels or casks of various diameters, and by means of the bolts B and B', and their respective pair of nuts, the chine may be cut at a greater or less distance from the rim or end of the barrel or cask, as may be desired.

What I claim as my invention, and desire to secure by Letters Patent, is—

The semicircular plate P, formed with channels or depressions $a$ $b$ $c$, for the reception of the cutting-knives K K and router D, and the gages G, said plate being capable of a vertical adjustment upon the stock A by the bolts and nuts B B' $m$ $m'$ $n$ $n'$, substantially as and for the purpose set forth.

JOHN P. SIEGFRIED.

Witnesses:
 E. B. SADLER,
 C. W. SADLER.